Patented Oct. 7, 1952

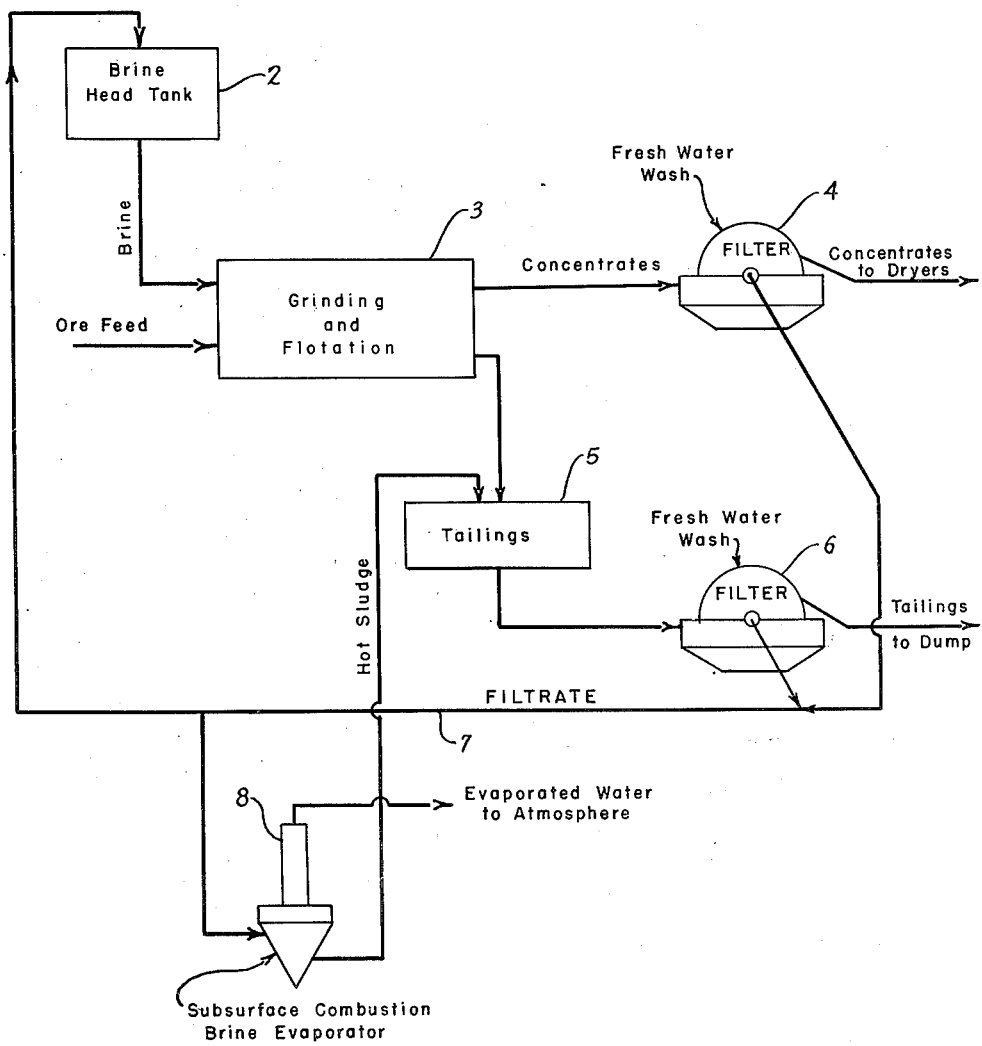

2,613,133

UNITED STATES PATENT OFFICE 2,613,133

PROCESS FOR RECOVERING A DESIRED SOLUBLE SALT FROM A SOLID MIXTURE CONTAINING SAME

Leslie D. Anderson, Carlsbad, N. Mex., assignor to Potash Company of America, a corporation of Colorado Application January 18, 1950, Serial No. 139,170

7 Claims. (Cl. 23—89)

This invention, which is a continuation-in-part of my preceding application, Serial No. 559,821, filed October 21, 1944, and now abandoned, the disclosure of which is hereby incorporated herein by reference, relates to processes for treating ores and similar mixtures of water-soluble salts to separate and purify one or more of the salts, and particularly to such processes in which a saturated solution of the salts is circulated in a closed circuit.

In the various processes for treating ores or other mixtures to separate water-soluble salts therefrom and to purify the salts, masses of the salts are solidified from the solution under treatment, or one salt is separated from another in the solution which acts as a carrier vehicle, and it is necessary to filter the masses to remove the solution; it is also desirable to wash the masses with water to remove excess solution, and particularly to remove one constituent in solution from another solids constituent of the treatment.

In such processes in which a saturated solution is continuously circulated through the several stages of the process and is returned to the initial stage, the amount of water which can be added to the circulating solution is limited in accordance with the quantities of water which are removed with the solid products and wastes. This washing which maintains the balance of the process is known as a one hundred per cent wash. Greater purity of the product can be attained by more complete washing, and a one hundred and fifty to two hundred per cent wash is desirable; however, the addition of the excess water to the circulating solution upsets the balance of the cyclic process; on the other hand, if the excess wash water is discarded with the waste, an appreciable amount of the salt which is dissolved in the wash water is lost.

Accordingly, it is an object of this invention to provide in a cyclic process for treating ores to separate purified salts and involving the continuous circulation of a saturated solution of the salts, an improved method for insuring complete washing of the solidified salt mass without upsetting the balance of the process cycle.

It is another object of this invention to provide an improved cyclic process for treating ores containing water-soluble salts to separate and purify a mass of salt and to wash the separated mass with an excess of water while maintaining the balance of the process cycle and without wasting the salts dissolved in the wash water.

It is an additional important object of my invention to provide a process for thermally treating solutions of water-soluble salts, particularly the continuously circulating brine utilized as a pulp carrier in refining operations for an ore containing a plurality of water-soluble salts, whereby improved separation of the soluble components is attained.

Further objects and advantages of this invention will become apparent from the following description and the features of novelty which characterize the invention will be pointed out with particularity in the claims annexed hereto and forming a part of this specification.

For a better understanding of the invention, reference may be had to the accompanying drawing, the single figure of which is a flow sheet or diagrammatic illustration of a mill arranged for operation in accordance with the process of the invention to separate purified potassium chloride from ores such as sylvinite ore.

Briefly, the treatment represented in the flow sheet is a flotation process in which finely ground ore such as sylvinite containing potassium and sodium chlorides is introduced into a saturated solution of the chlorides and sodium chloride is removed by flotation, the residue comprising solidified potassium chloride forming a mass which is then filtered and washed to provide substantially pure potassium chloride. The sodium chloride and impurities of the ore removed by flotation are conducted as a pulp in a saturated brine to a thickener, the thickened pulp product of which is subjected to filtration and washing to remove the solution which still contains potassium chloride. The particular flotation treatment is not a part of the present invention and a detailed description is not necessary to an understanding of the present invention.

Briefly stated, the operation involves a grinding stage in which the soluble constituents are unlocked. This operation preferably involves wet grinding in closed circuit with a classifier with a saturated solution of the soluble constituents acting as the liquid phase. The overflow of the classifier passes to the flotation stage where the aforesaid separation is attained.

In ore treatment processes such as that above-described, the amount of water which may be used for washing the concentrates and the waste products or tailings is limited by the amount of water which is removed from the cycle with those solid materials. In the process of this invention an excess of water is employed for washing the concentrates and tailings filter cakes, and the wash water filtrate is returned to the circulating solution. A portion of the solution is thereafter withdrawn and separately heated to vaporize the water and drive off the excess, resulting in the formation of a sludge of sodium chloride, while maintaining any potassium chloride in solution. The sludge and remaining solution in the withdrawn portion are then returned to the treatment cycle at the thickener stage. The quantity of water required to balance the process is thus maintained while affording complete washing of the concentrates and tailings and recovery of the valuable constituents removed with the wash water.

The temperature and control attained in the evaporation process is important and applicable to the treatment of solutions containing two or more water-soluble salts regardless of whether or not flotation procedures are utilized in attaining the primary or principal separation. For example, in the system described, the solubility of potassium chloride in water becomes greater with an increase in temperature than does the solubility of sodium chloride. If, therefore, a brine saturated with respect to sodium and potassium chlorides is to be refined, the solution may be heated to a second temperature higher than its initial temperature and sufficient water evaporated to approximately concentrate the heated solution with respect to potassium chloride. Under such circumstances the sodium chloride having exceeded its solubility at the second temperature will precipitate and may be discharged or otherwise treated, while the concentrated solution now enriched with respect to potassium chloride is recycled into the system for further use. If desired, additional water can be added to this solution, thereby adjusting the concentration thereof and maintaining the desired liquid balance.

In utilizing my invention, I prefer to operate the evaporator in such manner that both effects are attained; namely, that a predetermined quantity of water is removed from the system to compensate for the additional water in the wash operation, and that when such quantity of water has been removed the solution will be saturated with respect to potassium salts, but will have exceeded saturation with respect to the sodium salts, thereby occasioning precipitation of such salts. In systems where the reverse of the above-described situation exists, the desired salts may be precipitated during the evaporation operation. Under such circumstances it may obviously be collected and subsequently refined as desired.

Referring now to the flow sheet shown on the drawing, a brine comprising a saturated solution of sodium chloride and potassium chloride in water is supplied from a plant stock tank 2 to a grinding and flotation circuit 3 and at the same time the ore such as sylvinite is fed to the grinding stage. The ore is finely ground and introduced into the saturated solution within the circuit 3, preferably by wet grinding in a ball mill of said circuit. Sodium chloride and gangue matter are removed by flotation leaving a residue or pulp containing substantially pure solidified potassium chloride. This concentrated residue is then supplied to a filter 4, which may be a centrifuge or other suitable filtering apparatus, where the solution is filtered from the solidified mass of potassium chloride. The mass or cake of filtered concentrate is then conveyed to drying apparatus where excess moisture is removed, leaving the final product.

The froth removed during the flotation stage and which contains sodium chloride and gangue matter together with some saturated solution of the chlorides is conducted from the apparatus to a thickening apparatus 5, and the thickened pulp carrying the solid sodium chloride is then conducted to a filter or centrifuge 6, where the solid sodium chloride and solution are separated.

The filtrates from both the filters 4 and 6 are conducted back to the stock tank 2 through a suitable return conduit or path 7. It is assumed here that the purpose of the plant represented on the flow sheet is to separate pure potassium chloride concentrate and that other solid matter including sodium chloride is discharged to the dump as tailings. It is obvious that some of the solution which wets the masses or cakes of filtered concentrate and tailings may be removed from the filters 4 and 6 with the solid matter and that some of the solution may be lost to the closed circuit. It is therefore desirable to wash the solidified masses with pure water, however if more water is added than is to be removed with the solids, then the balance of the cycle is upset. Furthermore, the filtrates and wash water contain all the constituents of the solution including potassium chloride and any necessary reagents introduced for effecting the flotation treatment.

In order to employ excess water washing of the separated masses of concentrates and tailings, a portion of the returning solution in the conduit 7, which contains the excess wash water employed in the filters, is removed and supplied to an evaporator 8. Here water is vaporized to remove the excess water and a sludge of sodium chloride is formed; and this sludge, which includes some of the solution, is then reintroduced in the cycle at the thickener 5. By the operation of the evaporator 8, the excess water is continuously removed from the cycle and the correct balance is maintained. The remaining portion of the solution in the conduit 7 is returned to the stock tank 2.

The evaporator 8 may be of any suitable construction which affords controllable heating of the solution; for efficient operation an evaporator of the sub-surface combustion type has been found preferable. Evaporators of this type are provided with an arrangement for forcing a combustible mixture of gases under suitable pressure into a burner below the surface of the solution. Combustion takes place in the burner and the hot gases pass into the solution. The gases together with vaporized water are then exhausted to the atmosphere. Conditions in sub-surface combustion evaporators are such that evaporation takes place at temperatures below the normal boiling point of the solution. This characteristic is desirable in the present process to maintain lower temperatures of the hot sludge resulting from the evaporating process and which is supplied to the thickening stage. Furthermore, the temperature of the evaporating operation should be controlled with respect to the relative solubilities of the salts in the solution to prevent solidifying any of the potassium chloride while forming a sludge containing solid sodium chloride. This regulation of temperature by maintaining the potassium chloride in solution prevents the loss of potassium chloride to the dump with the solidified sodium chloride tailings.

It will be understood readily by those skilled in the art that the evaporating method of this invention may be applied to the process hereinbefore described. Furthermore, the process of this invention is obviously applicable to other ore treating processes which include the circulation of a saturated solution or brine in a closed circuit and in which excess fresh water washing of the final product is desirable in order to obtain purer concentrates and to entail less waste of the solution. As previously noted, it is not essential that the evaporation step of my procedure be utilized in connection with the system incorporating the froth flotation. On the contrary, brines containing a desired soluble salt and one or more additional undesirable salts may be concentrated by evaporation as herein described, provided the solubility of one of the salt components increases more rapidly with the increase of temperature than does the solubility of another of the salt components. If the system does not contain excess water, the quantity of water evaporated in attaining concentration of one of the salt components at an elevated temperature may be condensed and returned to the system, or an equivalent amount of water subsequently added to maintain the entire liquid balance. Thus this portion of my process is applicable to other refining systems of ore treatment. For example, this process may be employed in the flotation separation of potash, borax, sodium sulphate and potassium nitrate from their respective ores, as well as in similar operations treating chemical salts of whatever origin.

Accordingly it is not desired that the invention be limited to the particular application of the process described and illustrated, and it is intended by the accompanying claims to cover all modifications within the spirit and scope of the invention.

I claim:

1. A process for separating a desired component salt from admixture in a water-soluble ore, which comprises the steps of mixing the finely divided ore with a solution saturated with the component salts comprising said ore, removing an undesired component salt from said ore by flotation with the desired salt formed as a concentrate, separating the said other salt from solution entrained therewith after its removal from the flotation stage, separating the desired salt from the saturated solution in the concentrate, washing at least one of the component salts so separated with water and combining said wash water with the solution previously separated from at least one of the salts, evaporating a portion of the liquid mixture so formed to a concentration such that at a determined temperature of evaporation an amount of water is removed which is substantially equivalent to the amount of water used in said washing operation, thereby forming a salt sludge while preventing crystallization and precipitation of the desired component salt from solution, returning said sludge to one of said prior separation stages to separate associated solution from its solids content, and recycling the solution remaining after said evaporation for mixing with the ore prior to flotation, so that any crystallization of the desired component salt will occur not later than discharge from the flotation stages and will thus accompany the concentrates.

2. A process for separating a desired component salt from admixture with an undesired salt in a water-soluble ore, which comprises the steps of mixing the finely divided ore with a solution saturated with the component salts comprising said ore, removing the undesired component salt from said ore by flotation with the desired salt formed as a concentrate, separating the said other salt from solution entrained therewith after its removal from the flotation stage, separating the desired salt from the saturated solution in the concentrate, washing the component salts so separated with water and combining said wash water with the solution previously separated from the salts, evaporating a portion of the liquid mixture so formed to a concentration such that at a determined temperature of evaporation an amount of water is removed which is substantially equivalent to the excess of water used in said washing operation, thereby maintaining the liquid balance of the process and forming a salt sludge while preventing crystallization and precipitation of the desired component salt, returning said sludge to one of said prior separation stages to separate associated solution from its solid content, and recycling the solution remaining after said evaporation for mixing with the ore prior to flotation so that any crystallization of the desired component salt will occur not later than discharge from the flotation stage and will thus accompany the concentrates.

3. In a cyclic process for recovering a desired soluble salt component from a mixture of solids with which the component is associated, the steps of introducing said mixture into a solution saturated with respect to said desired soluble salt, separating the desired soluble salt from other solids contained in the solution, subjecting the soluble salt composition so separated to a filtering treatment, washing the filtered solids with water, filtering the other solids, combining said wash water with the filtrates of said filtering operations, evaporating a portion of the combined filtrates and wash water to a concentration such that a determined temperature of evaporation an amount of water is removed which is at least substantially equal to the excess of water used to wash the filtered solids, and returning the combined filtrate and wash water solution so adjusted to saturation as the saturated solution into which the solids mixture is introduced, whereby the liquid balance of the process is maintained.

4. In a cyclic process for recovering a desired soluble salt component from a mixture of solids with which the component is associated, the steps of introducing said mixture into a solution saturated with respect to said desired soluble salt, separating the desired soluble salt from other solids contained in the solution, subjecting the soluble salt composition so separated to a filtering treatment, separating the said other solids from the solution, washing the filtered solids with water, mixing said wash water and solution with the filtrates of said filtering operation, evaporating a portion of the mixture to a concentration such that at a determined temperature of evaporation an amount of water is removed which is substantially equivalent to the excess of water used to wash the filtered solids by introducing a combustible mixture of gases under pressure below the surface of said combined filtrates and wash water and burning said gases while maintained in the sub-surface position, and returning the resultant mixture as a solution so adjusted to saturation as the saturated solution into which the solids mixture is introduced, whereby the liquid volume in the process remains substantially constant.

5. A process for separating purified KCl from sylvinite which comprises the steps of mixing finely divided ore in a saturated solution of sodium and potassium chlorides, separating NaCl from the mixture by flotation, filtering solid KCl from the saturated solution in the KCl concentrates, thickening the froth floated NaCl, filtering NaCl from the NaCl sludge from the thickening operation, washing the filtered KCl and NaCl with water, combining said wash waters with said filtrates, evaporating a portion of the combined filtrates and wash water to a concentration such that at a determined temperature of evaporation an amount of water is removed which is equivalent to the amount of water used to wash the solid KCl and NaCl and a NaCl sludge is formed while maintaining the KCl in solution, returning said sludge to the thickening operation, returning the remaining portion of the combined filtrates and wash waters adjusted to saturation as the saturated solution to mix with the finely divided ore.

6. In a process for recovering a desired soluble salt component from a mixture of solids containing the desired soluble salt component and an undesired soluble salt component and in which the increase in solubility attained by an increase in temperature is greater for the desired salt than for the undesired salt, the steps of introducing said mixture of solids into a solution saturated with respect to said desired soluble salt, separating the desired soluble salt from the other solids contained in the solution, subjecting the separated solids to a filtering treatment, washing the filtered solids with water, combining the filtrate and wash water of said filtering operations, heating at least a portion of the combined filtrates and wash water to a second temperature to induce evaporation, continuing said evaporation until said portion of the solution is approximately saturated with respect to the desired soluble salt at said second temperature, discharging the precipitated solids from the solution, and recycling the concentrated portion of the solution for mixture with the untreated portion for subsequent mixture with said mixture of solids.

7. The cyclic process for separating a first salt from admixture with a second salt in a water-soluble ore, which comprises the steps of mixing ground ore with a circulating aqueous solution saturated with respect to the said first and second salts, separating the first salt from the second salt by froth flotation, separating the salt from solution entrained therewith after its removal from froth flotation stage, separating the second salt from the solution entrained therewith after its removal from the froth flotation stage, washing at least one of the salts with water, combining the wash water with the circulating solution, evaporating from a portion of the resulting solution a quantity of water sufficient to maintain the quantity of circulating solution at a substantially constant volume, said evaporation being conducted at a determined temperature for forming a sludge of the first salt while preventing crystallization of the second salt, returning the said sludge to one of the prior separation stages for separating entrained solution from the solids, and mixing the solution remaining after evaporation with the circulating solution prior to the flotation stage so that any crystallization of the second salt will occur before discharge from the flotation stage and the second salt particles so crystallized will accompany the concentrates.

LESLIE D. ANDERSON.

REFERENCES CITED

The following references are of record in the file of this patent:

UNITED STATES PATENTS

| Number | Name | Date |
|---|---|---|
| 2,188,932 | Weinig | Feb. 6, 1940 |
| 2,211,397 | Weinig | Aug. 13, 1940 |
| 2,336,854 | Ferris | Dec. 14, 1943 |
| 2,340,523 | Ferris | Feb. 1, 1944 |

OTHER REFERENCES

"Solubilities of Inorganic and Organic Compounds," by A. Seidell, pp. 641 and 643, 2nd ed., 2nd printing, D. Van Nostrand Co., Inc., N. Y.